THOMAS & MAST.

Seed Planter.

No. 3,164. Reissued Oct. 20, 1868.

N. PETERS, Photo-Lithographer, Washington, D. C.

UNITED STATES PATENT OFFICE.

J. H. THOMAS AND P. P. MAST, OF SPRINGFIELD, OHIO.

IMPROVEMENT IN SEED-PLANTERS.

Specification forming part of Letters Patent No. 21,034, dated July 27, 1858; Reissue No. 3,164, dated October 20, 1868.

*To all whom it may concern:*

Be it known that we, J. H. THOMAS and P. P. MAST, of Springfield, in the county of Clarke and State of Ohio, have invented certain new and useful Improvements in Grain-Drills; and we do hereby declare that the following is a full, clear, and exact description thereof, reference being had to the accompanying drawings, making part of this specification, and to the letters of reference marked thereon.

Figure 1:
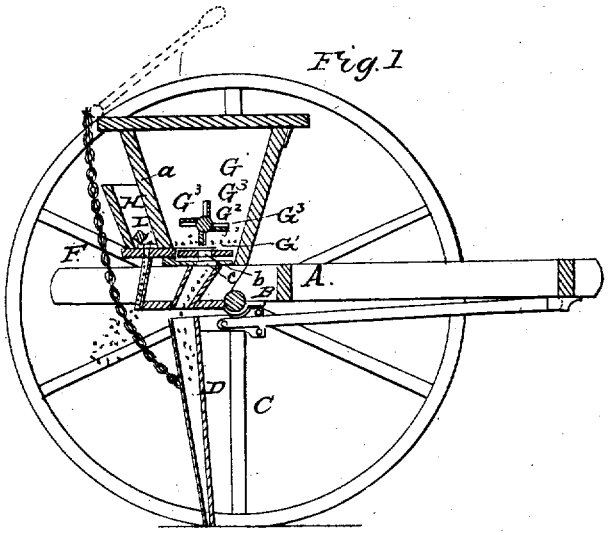
Figure 2:
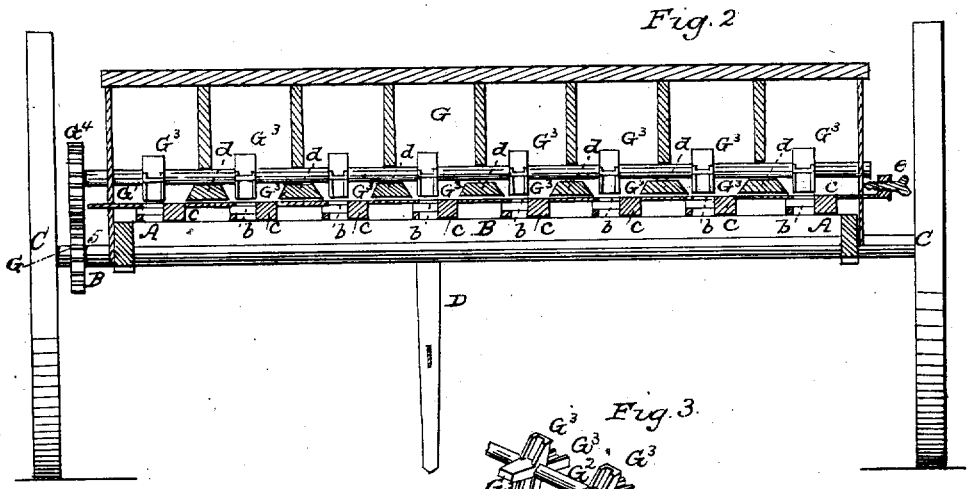
Figure 3:
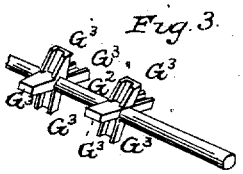

Figure 1 is a longitudinal section of our improved machine. Fig. 2 is a vertical transverse section of the same, and Fig. 3 is a perspective view of a portion of the seed-stirring shaft and arm detached.

Like letters indicate like parts in each of the figures.

Our invention consists in a novel construction and arrangement of agitators and slide for distributing and regulating the flow of the seed or grain, as hereinafter explained.

In constructing our improved drill we make a frame, A, and mount it on an axle, B, having a wheel, C, at each end, as is usual in this class of machines. To the frame drill-tubes D are attached by drag-bars, as shown in Fig. 1, and upon the frame A, just in rear of the axle, is mounted the hopper G, which receives the grain to be sown. This hopper G is divided by transverse partitions *d* into a series of cells or compartments, as shown in Fig. 2. A shaft, $G^2$, extends through these partitions lengthwise of the hopper, and protrudes at one end thereof, where it has secured upon it a spur-wheel, $G^4$, gearing into a similar wheel, $G^5$, fastened upon the axle B, as represented in Fig. 2. Upon this shaft $G^2$, in each compartment of the hopper, is secured a series of projecting arms, $G^3$, which have their front face recessed, as shown clearly in Fig. 3, and which, instead of projecting radially, stand tangentially, as represented in Fig. 1, the object of these arms being to agitate or stir up the grain in the hopper and cause it to be fed out evenly. The bottom of the hopper is perforate d under each compartment, and above this bottom is placed a regulating seed-slide, G′. This slide has a series of openings or holes in it corresponding with the holes in the hopper-bottom for the grain to pass through. These holes *b* in the slide G′ are rectangular in form, and are elongated lengthwise of the slide. To the bottom, underneath the slide G′, is secured a series of vertical projections or blocks, *c*, which are of such a width as to fit in the holes *b* in the slide, and are of such a height as to have their upper ends project up through the holes *b* and come flush with the upper surface of the slide G′, as represented in Fig. 2. When these parts are thus constructed and arranged it will be apparent that the size of the openings *b* in the slide G′ may be varied as desired. By moving the slide to the right the openings *b* will be decreased in size, and by moving it to the left they will be increased, it being observed that as the slide is moved to the right that portion of the hole *b* which would be thereby opened on the right-hand side of the blocks *c* is brought under the partition *d*, which is made thicker at its bottom, as shown in Fig. 2, for the purpose of covering these openings. By moving the slide to the right as far as it will go it will be seen that the flow of the seed will be entirely stopped, as that part of the openings *b* not filled by the blocks *c* will then be entirely under the partitions *d* and covered thereby. A set-screw attached to the outer end of the slide, as represented in Fig. 2, serves to adjust the openings *b* with accuracy to any desired capacity.

Having thus described our invention, what we claim is—

1. The arms $G^3$, mounted upon the shaft $G^2$, within the hopper G, substantially as and for the purpose described.

2. The slide G′, having the openings *b*, with the blocks or stops *c* fitting therein, and arranged to operate as described.

3. The combination of the slide G′ and blocks or stops *c* with the revolving arms $G^3$, all arranged to operate as herein set forth.

J. H. THOMAS.
P. P. MAST.

Witnesses:
C. E. THOMAS,
JOS. W. THOMAS.